(12) United States Patent
Bobst

(10) Patent No.: US 8,121,266 B2
(45) Date of Patent: Feb. 21, 2012

(54) METHOD FOR CHECKING A RING-BACK SIGNAL

(75) Inventor: Hanspeter Bobst, Oensingen (CH)

(73) Assignee: Swissqual License AG (CH)

( * ) Notice: Subject to any disclaimer, the term of this patent is extended or adjusted under 35 U.S.C. 154(b) by 294 days.

(21) Appl. No.: 12/599,111

(22) PCT Filed: May 8, 2007

(86) PCT No.: PCT/CH2007/000232
§ 371 (c)(1),
(2), (4) Date: Nov. 6, 2009

(87) PCT Pub. No.: WO2008/134902
PCT Pub. Date: Nov. 13, 2008

(65) Prior Publication Data
US 2010/0296635 A1 Nov. 25, 2010

(51) Int. Cl.
*H04M 1/64* (2006.01)
*H04M 3/42* (2006.01)
(52) U.S. Cl. .............................. 379/88.23; 379/207.16
(58) Field of Classification Search .................. 379/67.1, 379/88.18–88.23, 207.16; 455/414.1, 466
See application file for complete search history.

(56) References Cited

U.S. PATENT DOCUMENTS

2006/0245571 A1  11/2006  Radziewicz et al.
2007/0168462 A1* 7/2007  Grossberg et al. ............. 709/217
2010/0191525 A1* 7/2010  Rabenko et al. ............... 704/211

OTHER PUBLICATIONS

International Search Report dated Feb. 25, 2008, issued in corresponding international application No. PCT/CH2007/000232.
"Ringback tone." Wikipedia: http://en.wikipedia.org/wiki/ringback_tone. 2 pages, accessed Nov. 5, 2009.
"Peak signal-to-noise ratio." Wikipedia: http://en.wikipedia.org/wiki/Peak_signal-to-noise_ratio. 2 pages, accessed Nov. 5, 2009.
Hutchinson, M. "Windowing in Voice Conversion." Connexions: http://cnx.org/content/m12476/latest. 2 pages, accessed Nov. 5, 2009.
"Spectral density," Wikipedia: http://en.wikipedia.org/wiki/Power_spectral_density. 5 pages, accessed Nov. 5, 2009.

* cited by examiner

*Primary Examiner* — Davetta W Goins
*Assistant Examiner* — Mohammad Islam
(74) *Attorney, Agent, or Firm* — Ostrolenk Faber LLP

(57) ABSTRACT

The present invention relates to a method for checking a ring-back signal comprising the following steps, time synchronizing a first device and a second device, causing an event by requesting the configuration of a ring-back signal with and for the first device at a specific time stamp and capturing the time stamp and the event in a first log file, calling the first device with the second device at a specific time stamp, recording the ring-back signal of the first device, comparing the ring-back signal with at least one reference signal yielding a comparison result, and capturing the time stamp and the comparison result in a second log file, and comparing the second log file with the first log file.

10 Claims, 3 Drawing Sheets

METHOD FOR CHECKING A RING-BACK SIGNAL

CROSS REFERENCE TO RELATED APPLICATIONS

The present application is a 35 U.S.C. §371 National Phase conversion of PCT/CH2007/000232, filed May 8, 2007, the disclosure of which is incorporated herein by reference. The PCT International Application was published in the English language.

TECHNICAL FIELD

The invention relates to a method for checking a ring-back signal according to the preamble of claim 1. A ring-back signal may be a ring-back tone and/or a ring-back video. A ring-back tone is usually an audible ringing that is heard on a telephone line by a calling party after dialing and prior to the call being answered by the called party. Correspondingly, a ring-back video is a visible data stream that is seen on the display of a telephone device, such as a mobile telephone, by the calling party after dialing and prior to the call being answered by the called party. The called party may also be called receiving party.

BACKGROUND

The ring-back signal is generally not generated by the called telephone device itself but by the receiving party telephone or servicing switch. In recent years personalized ring-back signals have become popular. The called party can, for example by sending an SMS (short message service) or USSD (unstructured supplementary service data), to the servicing switch request configuration of such a personalized ring-back signal. Then the calling party will hear and/or see this personalized ring-back signal when calling the called party before the called party answers the call. Ring-back signals may include music, videos, messages, and further special effects. In addition, the called part may define specific calling parties to which the personalized ring-back signals will be played while other calling parties will receive the "traditional", non-personalized ring-back signals (see http://en.wickipedia.org/wiki/ringback_tone).

While the called party can request configuration of a new personalized ring-back signal, it usually does not have the instruments to check if a calling party actually hears and/or sees the new configured ring-back signal.

DISCLOSURE OF THE INVENTION

It is an object of the invention to provide a method for checking a ring-back signal. With the method according to the invention it shall be possible to determine if a personalized ring-back signal has been configured, if the correct personalized ring-back signal has been configured, how long it has taken a ring-back signal server such as a telephone switch to configure the requested personalized ring-back signal, the quality of the ring-back signal, and if the configuration or provision of a personalized ring-back signal can be deactivated.

In order to implement these and still further objects of the invention, which will become more readily apparent as the description proceeds, a method for checking a ring-back signal is provided, that comprises the steps of time synchronizing a first device and a second device, causing an event by requesting a configuration of a ring-back signal with and for the first device at a specific time stamp and capturing the time stamp and the event in a first log file, calling the first device with the second device at a specific time stamp, recording the ring-back signal of the first device, comparing the ring-back signal with at least one reference signal yielding a comparison result, capturing the time stamp and the comparison result in a second log file, and comparing the second log file with the first log file. The first device and the second device are for example telephone devices such as mobile telephones. The first device may request the configuration of a ring-back signal, i.e. of a personalized ring-back signal, by sending a corresponding message, for example a SMS to a ring-back signal server such as a telephone or servicing switch, which is then responsible for the actual configuration of the ring-back signal. After receipt of the request the ring-back signal server may send an acknowledgement message to the first device, which then may be stored in the first log file. Preferably, however, the first device does not wait for the receipt of the acknowledgement message. The method according to the invention is preferably implemented as so called offline method.

According to the method of the invention the second device calls the first device and then the ring-back signal of the first device, which is received by the second device, is recorded and compared with a reference signal.

For the comparison of the recorded ring-back signal with the reference signal, for example, the so called PSNR (peak signal-to-noise ratio, confer http://en.wikipedia.org/wiki/Peak_signal-to-noise_ratio) method may be employed. Thereby the PSNR between the recorded ring-back signal and the reference signal is calculated in dB, which gives a grade of similarity between the two signals. If the calculated PSNR is then larger than a certain appropriate, predefined threshold, then the two signals are not similar. It the calculated PSNR lies below this predefined threshold, then the two signals are considered to be similar to each other. Furthermore, the recorded ring-back signal and the reference signal can be compared by using the so called signal envelope comparison and/or the so called spectral density comparison.

In the signal envelope comparison, the envelope of each of the two signals is obtained (confer http://cnx.org/content/m12476/latest). An envelope can in particular be obtained by taking the absolute value of a signal and subjecting it to an averager. An averager basically convolves the signal with a boxcar. Then the envelopes of the two signals are compared to each other and the difference between the two envelopes, preferably the weighted difference, is assessed for reaching a decision about the similarity between the two signals.

For the spectral density comparison (http://en.wikipedia.org/wiki/Power_spectral_density) the spectral density of each of the two signals is calculated and the difference, preferably the weighted difference, between the two spectral density is then used to calculated the similarity grade between the two signals.

The comparison results obtained for example by the above-mentioned comparison methods (PSNR method, signal envelope comparison, spectral density comparison) may also be used to assess quality of the ring-back signal. The comparison result consists of a rational number (or a sequence or an array of rational numbers) a quality scale can be defined. For example, a typical comparison result obtained by the PSNR method may lie between 0 to 100 dB whereby 0 dB stands for totally different signals (lowest similarity) and 100 dB (this value may differ due to ring-back signal size, e.g. the size of a picture, the length of a tone and/or the size and the length of a video) stands for maximum similarity between the recorded ring-back signal and the reference signal and, hence, highest quality.

The reference signal may be an already recorded ring-back signal which has been previously recorded, in particular, during the last call of the first device with the second device. Comparing the currently recorded ring-back signal with the previously recorded ring-back signal yields as comparison result the information that the ring-back signals are basically identical or not. This information can e.g. be in form of a Boolean character and is stored as comparison result in the second log file.

The reference signal may also be an entry of a reference list with reference ring-back signals. The reference list may be stored in the second device. The comparison result then may be the information to which reference ring-back signal the recorded ring-back signal is basically identical or that the recorded ring-back signal differs from all entries of the reference list. This information is then stored as comparison result in the second log file, for example, as the reference ring-back signal with which the recorded reference ring-back signal is identical or as the running number associated with this reference ring-back signal, the running number "zero" then being assigned if the recorded ring-back signal does not correspond to anyone of the entries of the reference list.

In the last step of the method according to the invention the first log file and the second log file are compared, i.e. the entries of the first log file are compared with the entries of the second log file. The entries of the first log file are the events caused by the first device and their time stamps, i.e. each time the first device requests a configuration of a ring-back signal an entry is made into the first log file. Additionally requested ring-back signal, which is requested in the event, may be captured in the first log file. The entries of the second log file are the above-described comparison results and the corresponding time stamps at which the first device has been called by the second device.

If, after an event has been caused by the first device and a corresponding entry has been made into the first log file, the comparison result captured in the second log file comprises the information that the recorded configured ring-back signal of the first device differs from the previously recorded ring-back signal of the first device that has been recorded before the event has been caused by the first device, then configuration of a new ring-back signal has been achieved. If the requested ring-back signal has been captured in the first log file and corresponds to a recorded ring-back signal or a reference ring-back signal corresponding to the recorded ring-back signal, or a corresponding running number, respectively, which has been captured in the second log file, then the correct ring-back signal has been configured. If the comparison result in the second log file is zero or void, then this may be an indication that the quality of the recorded ring-back signal is too low to be compared with either previously recorded ring-back signals or an entry of a reference list. Furthermore, if the is comparison result in the second log file, that is for example the recorded ring-back signal or a reference ring-back signal corresponding to the recorded ring-back signal, or a corresponding running number, respectively, does not correspond to a (requested) "traditional" ring-back signal, then deactivation of the provision of a personalized ring-back signal may not have been performed by the a ring-back signal server such as a telephone or servicing switch. Deactivation of the provision of a personalized ring-back signal may e.g. be requested by an event caused by the first device requesting the configuration of the traditional ring-back signal

BRIEF DESCRIPTION OF THE DRAWINGS

Further advantageous features and applications of the invention can be found in the dependent claims as well as in the following description of the drawings illustrating the invention. In the drawings like reference signs designate the same or similar parts throughout the several figures of which:

MODES FOR CARRYING OUT THE INVENTION

Figure 1:
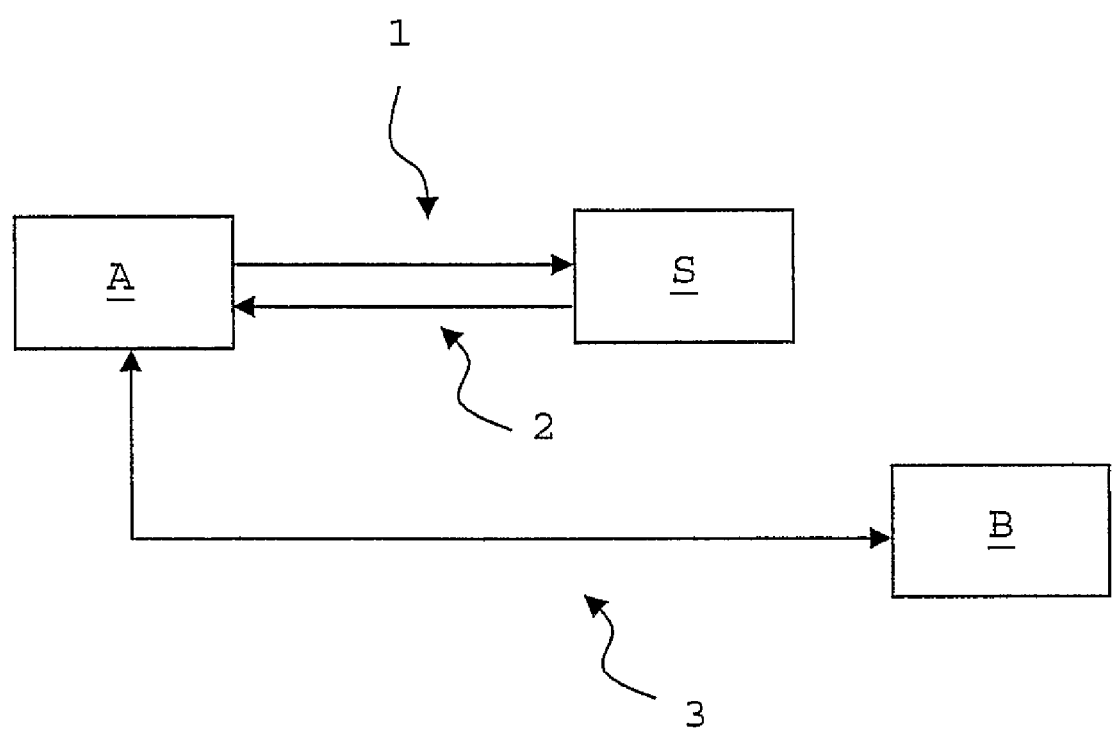
FIG. 1 shows a schematic representation of a system for performing the method according to the invention.

FIG. 1 shows a schematic representation of a system with a first device A, a second device B and a ring-back signal server S for carrying out the method according to the invention. The ring-back signal server S provides and configures, respectively, a ring-back signal for the first device A. The ring-back signal server S may for example be a servicing or a telephone switch. To request the configuration of a ring-back signal the first device A causes a corresponding event in particular by sending an appropriate message 1, for example a SMS, to the ring-back signal server S. The ring-back signal server S preferably acknowledges the request, i.e. receipt of the message 1, by sending an acknowledgement message 2 to the first device A. The second device B calls the first device A (arrow 3) thereby causing the ring-back signal to be played, so that it is heard and/or seen by the second device B (arrow 3).

Figure 2:
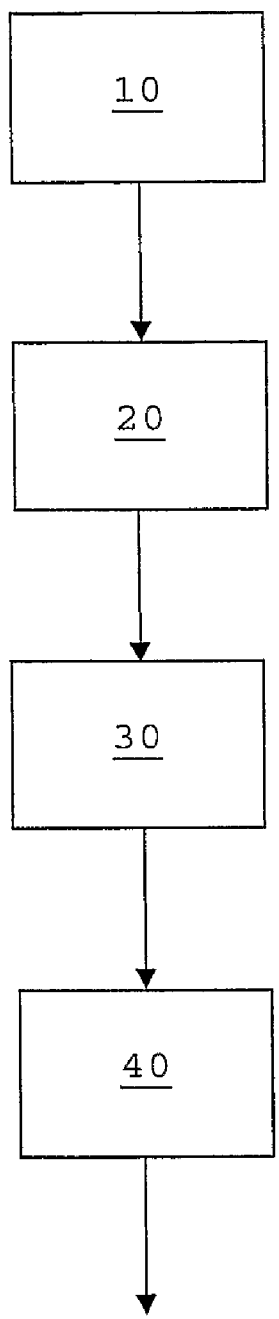
FIG. 2 shows a flow chart of the method according to the invention.

FIG. 2 depicts a flow chart of the method according to the invention which can be realized with a system as shown in FIG. 1. In a first step 10 the first device A and the second device B are synchronized. In a second step 20 an event is caused with and for the first device A by requesting configuration of a ring-back signal at a specific time stamp. The time stamp and the event are captured in a first log file associated with the first device A. Not only the event of requesting the configuration of a ring-back signal but also the requested ring-back signal may be captured in the first log file. Causing an event by requesting a configuration of ring-back signal may also mean the request of setting the ring-back signal back to the traditional ring-back signal, i.e. requesting to discard the personalized ring-back signal.

In a third step 30 the first device A is called by the second device B at a specific time stamp. The ring-back signal appearing when calling the first device A is recorded and compared with one or more reference signals yielding a comparison result. The comparison result and the time stamp are captured in a second log file associated with the second device B. In a last step 40 the second log file and the first log file are compared.

As described above, the reference signal may be a previously recorded ring-back signal, the comparison result then being the information, whether the ring-back signal has been altered by the ring-back signal server S on request of the first device A. The reference signals may also be entries of a reference list, i.e. they may be reference ring-back signals. If the recorded ring-back signal corresponds to one of the reference ring-back signals, then the comparison result comprises this information, e.g. the comparison result may then be equal to the running number of the reference ring-back signal to which the recorded ring-back signal is basically identical.

Step 20 of the method of the invention is preferably repeated at certain first time intervals, which may for example be thirty seconds. Step 30 is preferably also repeated at certain second time intervals, the first time intervals preferentially being longer than the second time intervals. The second time interval may for example be one second. That is, the second device B calls the first device A more often than the first device A causes an event by requesting the configuration of a ring-back signal by the ring-back signal server S. The second time intervals are preferably much shorter than the first time intervals, so that the second device B may call the first device A shortly after the first device A has caused an event. The first time intervals associated with the first device A and the second time intervals associated with the second device B are preferably equidistant but could also be non-equidistant.

By comparing the entries of the second log file and the first log file in step 40 it can be determined how long it takes the ring-back signal server S to configure a requested ring-back signal. As the second device B calls the first device A preferably more often than the first device A causes an event, there are several entries of the second log file corresponding to one entry of the first log file. If the several entries of the second log file corresponding to an event caused by the first device first after several entries into the second log file show a positive comparison result, i.e. a comparison result indicating that the requested change or configuration, respectively, of the ring-back signal has taken place, then the number of entries with negative comparison results, that is comparison results indicating that no change in the ring-back signal has yet taken place or not the requested ring-back signal is played, indicates the amount of time that it has taken the ring-back signal server S to configure the requested ring-back signal.

Figure 3:
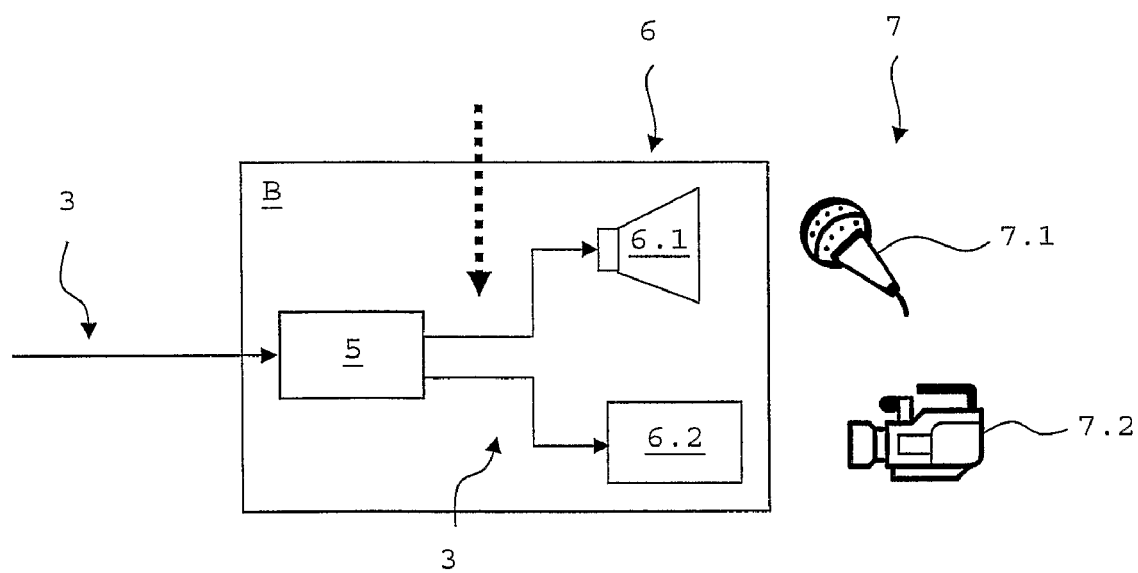
FIG. 3 shows the ring-back signal receiving part of the second device and recording means.

FIG. 3 shows the ring-back signal receiving part of a second device B, wherein reference sign 3 designates the transmission path of the ring-back signal from a first device A (not shown) to the second device B after it has called the first device A. The second device B in particular comprises a decoder 5 for decoding the received ring-back signal. After the decoder 5 the now decoded ring-back signal is transmitted to a user interface 6 and output to a user.

Depending on the nature of the ring-back signal the user interface outputting the decoded ring-back signal may comprise various output devices. If the ring-back signal is, for example, a ring-back tone (i.e. an audio signal), then the user interface 6 may comprise a loudspeaker. If the ring-back signal takes the form of a ring-back video (i.e. is a video signal), then the user interface 6 may comprise a display 6.2. If the ring-back signal comprises a tone and a video, then the user interface 6 preferentially comprises a loudspeaker 6.1 and a display 6.2. Additionally or alternatively the user interface 6 may comprise one or more electrical interfaces (not shown). For a ring-back signal in form of an audio signal, for example, a so called "line-out" connector to which an audio cable may be connected can be employed as electrical interface. For a ring-back signal in form of a video signal a so called S-video jack may be used as electrical interface. In addition or alternatively a software program for capturing the ring-back signal may be implemented directly on the second device B, which e.g. may be a mobile phone. With such a software program a ring-back signal which in particular is in the form or has been converted to a digitally video or/and audio stream can be captured by storing it into an internal memory of the second device B.

The recording of the ring-back signal in step 30 (confer FIG. 2) takes preferably place in close proximity to the user interface 6 of the second device B and in particular after the decoder 5 in the transmission path 3 by appropriate recording means 7. This is indicated in FIG. 3 by a bold dotted arrow. Even more preferably the recording of the ring-back signal takes place after the user interface 6 by appropriate recording means 7. If the ring-back signal comprises a ring-back tone which is outputted by a loudspeaker 6.1 then a microphone 7.1 can be used as recording means 7. If the ring-back signal comprises a ring-back video which is outputted on a display 6.2, then a camera 7.2 can be used as recording means 7. If the ring-back signal comprises a ring-back tone and a ring-back video which are outputted on a loudspeaker 6.1 and a display 6.2, then a camera 6.1 and a microphone 7.1 may be employed as recording means 7. Alternatively or additionally a software program implemented on the second device B may be used to record the ring-back signal received by the second device B as mentioned above.

Of course several first devices A and/or several second devices B may be used, which may for example be located in different countries. There may be one first log file associated with all first devices A or there may be several first log files with one first log file associated with each first device A and all first log files being combined for performing the comparison in step 40 (confer FIG. 2) of the method according to the invention. The same may be true for the second log file or several second log files associated with the second devices B.

With a method corresponding to the method according to the invention, in particular with a method comprising the steps 30 and 40 (confer FIG. 2) of the method according to the invention, other services of a telephone or servicing switch may be checked, such as for example the message played by an answering machine which is heard by a calling party when calling a first device A and a call is not been answered by the receiving party.

It is to be understood that while certain embodiments of the present invention have been illustrated and described herein, it is not to be limited to the specific embodiments described and shown.

What is claimed is:

1. A method for checking a ring-back signal comprising the following steps:
   a) time synchronizing a first device and a second device,
   b) causing an event by requesting the configuration of a ring-back signal with and for the first device at a specific time stamp and capturing the time stamp and the event in a first log file,
   c) calling the first device with the second device at a specific time stamp, recording the ring-back signal of the first device, comparing the ring-back signal with at least one reference signal yielding a comparison result, and capturing the time stamp and the comparison result in a second log file, and
   d) comparing the second log file with the first log file.

2. The method according to claim 1, wherein the reference signal is a previously recorded ring-back signal.

3. The method according to claim 1, wherein the reference signal is an entry of a reference list with reference ring-back signals.

4. The method according to claim 1, wherein step c) is repeated at certain second time intervals.

5. The method according to claim 4, wherein step b) is repeated at certain first time intervals, a first time interval being longer than the second time interval.

6. The method according to claim 1, wherein the first device records an acknowledgement message regarding the configuration request of the ring-back signal in step b) if applicable.

7. The method according to claim 1, wherein in step b) also the requested ring-back signal is captured in the first log file.

8. The method according to claim 1, wherein in step c) the recording of the ring-back signal takes place in close proximity to a user interface of the second device.

9. The method according to claim 8, wherein the second device comprises a decoder and the recording of the ring-back signal takes place after the decoder in the transmission path.

10. The method according to claim 1, wherein in step c) the recording of the ring-back signal is performed by a microphone and preferably a camera.

* * * * *